United States Patent [19]

Bresnahan

[11] Patent Number: 5,063,616
[45] Date of Patent: Nov. 12, 1991

[54] FLEXIBLE DRAINAGE TRAP

[76] Inventor: Jeremiah J. Bresnahan, 6311 Juniata, St. Louis, Mo. 63139

[21] Appl. No.: 583,661

[22] Filed: Sep. 17, 1990

[51] Int. Cl.$^5$ .................. E03C 1/284; F16K 13/00
[52] U.S. Cl. .................. 4/191; 4/DIG. 16; 137/247.49
[58] Field of Search .......... 4/191, DIG. 13, DIG. 16; 137/247, 247.11, 247.41, 247.49; 285/177; 138/118, 119, DIG. 8

[56] References Cited

U.S. PATENT DOCUMENTS

| Re. 5,953 | 6/1874 | Lowe | 137/247.49 |
|---|---|---|---|
| D. 231,930 | 6/1974 | Danks | D23/46 |
| 128,263 | 6/1872 | Thompson | 137/247.49 |
| 172,865 | 2/1876 | Brandeis | 137/247.49 |
| 178,059 | 5/1876 | Hutchins | 137/247.49 |
| 220,767 | 10/1879 | McCloskey | 137/247.49 |
| 2,484,031 | 10/1949 | Havrenius | 182/7 |
| 2,817,092 | 12/1957 | Hahn | 4/DIG. 13 |
| 2,935,992 | 5/1960 | Barker et al. | 137/247.11 |
| 3,313,314 | 4/1967 | Burke et al. | 137/247.27 |
| 3,534,778 | 10/1970 | Goecke | 138/122 |
| 3,860,978 | 1/1975 | Wirth | 4/207 |
| 3,908,208 | 9/1975 | McIlroy | 4/207 |
| 3,967,324 | 7/1976 | Olive | 4/207 |
| 4,516,278 | 5/1985 | Lamond | 4/191 |
| 4,750,219 | 6/1988 | Williams | 4/DIG. 13 |
| 4,758,027 | 7/1988 | Todd | 285/177 |
| 4,832,375 | 5/1989 | Emberson | 285/177 |
| 4,850,615 | 7/1989 | Giametta | 285/177 |
| 4,997,209 | 3/1991 | McGrath et al. | 285/177 |

FOREIGN PATENT DOCUMENTS

| 1188515 | 3/1965 | Fed. Rep. of Germany | 4/191 |
|---|---|---|---|
| 1409730 | 4/1969 | Fed. Rep. of Germany | 137/247.41 |
| 0592653 | 9/1947 | United Kingdom | 137/247.49 |
| 1063711 | 3/1967 | United Kingdom | 4/DIG. 13 |

*Primary Examiner*—William A. Cuchlinski, Jr.
*Assistant Examiner*—John L. Beres
*Attorney, Agent, or Firm*—Grace J. Fishel

[57] ABSTRACT

A drainage trap with a trap portion is described for use with drain pipes from sinks or other fixtures that fits pipe of different diameters, the drain pipes need not be in perfect alignment. The drainage trap can be easily attached and detached at its upper end to a drain outlet and at its lower end to a discharge pipe, is molded of a self-supporting, flexible material which allows the drainage trap to be manually manipulated. The drainage trap has an S-shaped configuration which enables the trap portion to be movable in a vertical direction towards the drain outlet and a horizontal direction towards the discharge pipe for the purpose of draining the trap portion.

6 Claims, 2 Drawing Sheets

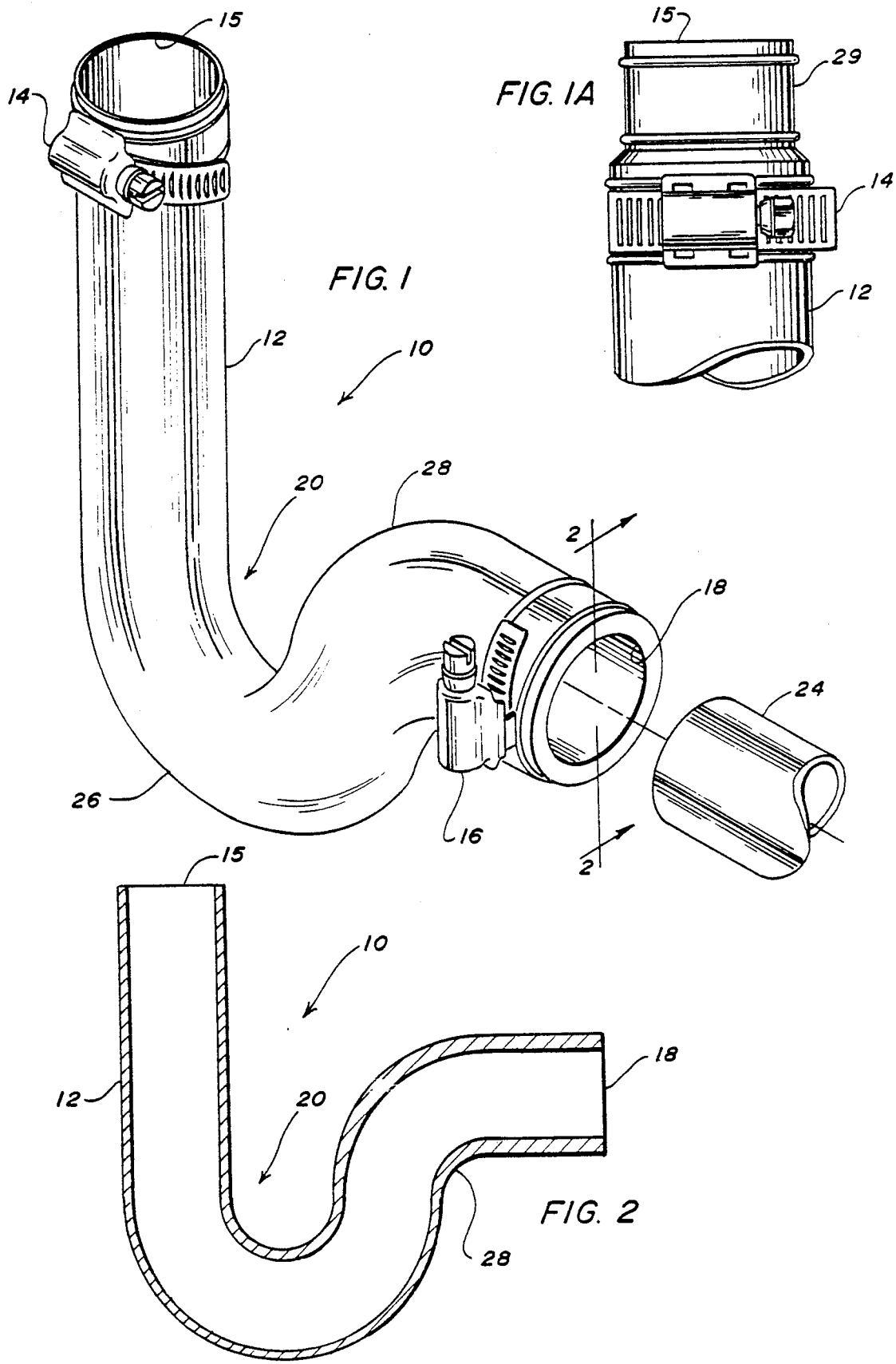

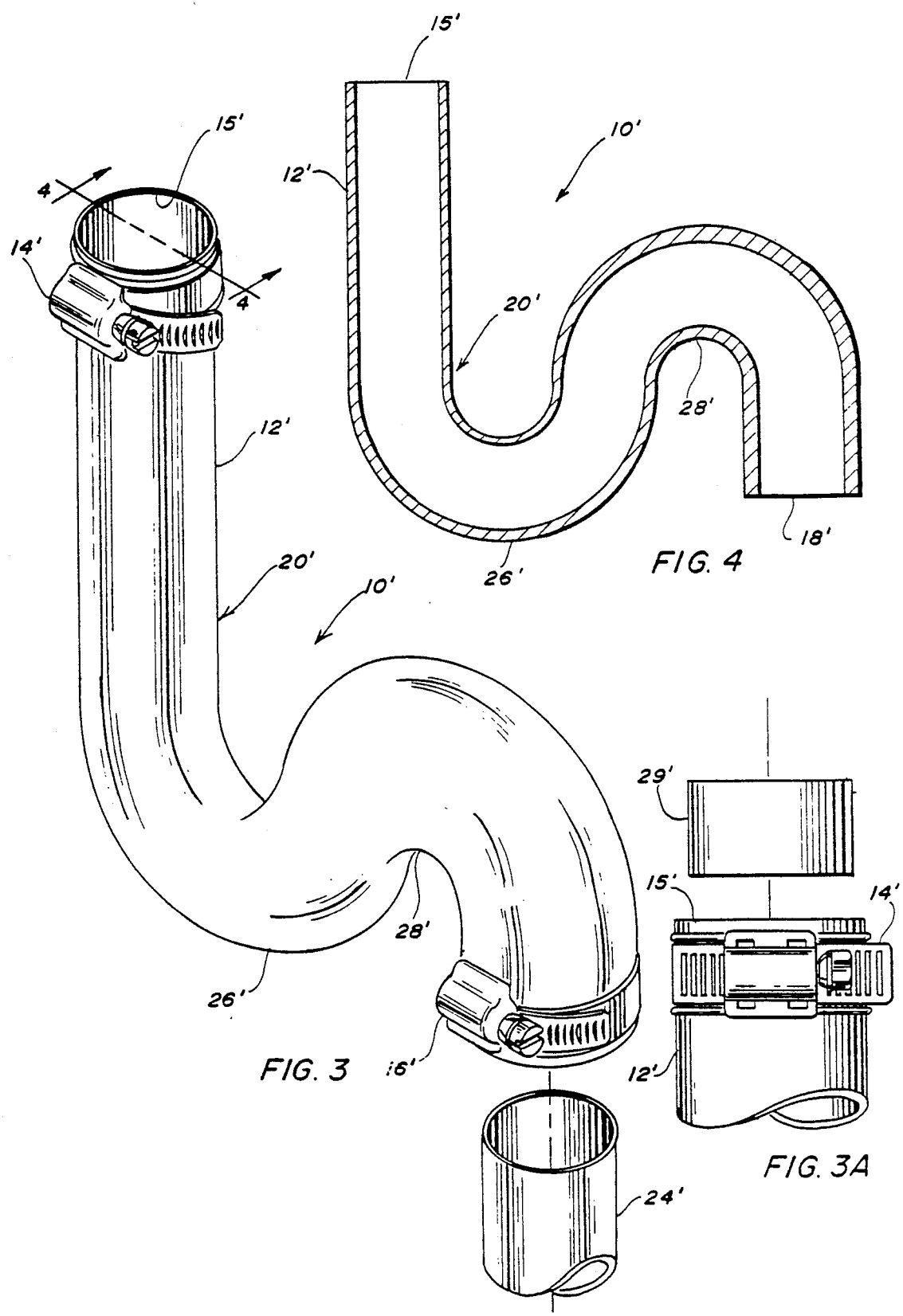

FLEXIBLE DRAINAGE TRAP

BACKGROUND OF THE INVENTION

This invention relates to a flexible drainage trap easily adaptable to fit a variety of pipes and usable with sinks and other similar apparatus for disposing of liquid waste.

A typical drainage trap has an U-shaped configuration with a trap portion formed at the bend. The trap portion serves as a water-seal for preventing foul air from passing through the trap from the sewer or septic system. If the drainage trap is in an unheated area under freezing conditions, it is likely to split unless the liquid is drained from the trap or the trap filled with antifreeze or the like.

With ordinary drainage traps made of metal or hard plastic, the drainage trap is drained by disconnecting one end of the drainage trap from the sink and disconnecting the other end from the drain pipe. The trap portion is then drained and the drainage trap reconnected to the sink and drain pipe. The same operation is necessary to clean the trap portion if it fills with solid waste which cannot be otherwise dislodged.

Prior art flexible drainage pipes can be manually massaged, more or less effectively, for unclogging the trap portion of solid waste but none are designed in such a way that the liquid can be drained from the trap without some disassembly.

One example of a previously available drainage trap is shown in U.S. Pat. No. 3,860,978 to Wirth. The patent shows a trap composed of a length of flexible hose supported by a bracket in a U-shape, with male and female fittings for connections to pipes from a sink and to an outlet pipe connected to a sewer or septic system. The patent fails to provide a solution to the problems associated with draining the trap portion without dismantling one or both of the ends of the drainage trap.

U.S. Pat. No. 3,534,778 to Goecke discloses a flexible conduit which has a spiral reinforcement. The patent fails to provide a solution to the problems of dismantling the drainage trap to effect drainage of the trap portion.

U.S. Pat. No. 2,935,992 to Barker et al. illustrates a flexible trap having a ball-like configuration with internal partitions requiring vertical alignment of the pipes.

U.S. Pat. No. 3,908,208 to McIlroy illustrates a quick release trap which is fabricated from a deflectable type of plastic material which is connected at the ends by resilient clamps. The drainage trap requires that each end be dismantled to drain the trap portion.

U.S. Pat. No. 4,516,278 to Lamond illustrates a U-shaped flexible drainage trap that can be manually manipulated to push solid waste through the trap portion. However, the U-shaped configuration limits movement of the drainage trap such that it is not possible to drain liquid waste from the trap portion without dismantling the drainage trap.

SUMMARY OF THE INVENTION

In accordance with the present invention, a flexible drainage trap is provided having a trap portion which is usable with a variety of pipes and is preferably made of a self-supporting, shapeable elastomeric material which is rigid enough to support the drainage trap without external brackets or the like but which is flexible enough to allow the trap portion to be drained without disconnecting the flexible drainage trap from the sewer or septic line in which it is connected. The drainage trap of the present invention is configured in such a shape to allow horizontal and vertical movement of the trap portion to effect drainage of liquid and solid wastes.

An important object of the present invention is to provide a self-supporting, flexible drainage trap which is movable to effect drainage of the trap portion.

A further object of the present invention is to provide a self-supporting, flexible drainage trap which can be manually manipulated to dislodge accumulated solid waste.

A further object of the present invention is to provide a self-supporting, flexible drainage trap that can be connected to pipes in a sewer or septic system that are not in perfect alignment.

A further object of the present invention is to provide a self-supporting, flexible drainage trap that can be readily mounted and dismounted by unskilled personnel.

A further object of the present invention is to provide a self-supporting, flexible drainage trap that can be used with different types of pipes and on a variety of apparatus.

In accordance to the present invention a self-supporting, flexible drainage trap is provided having a trap portion. The drainage trap of the present invention can be manually manipulated and is movable to remove liquid or solid waste from the trap portion. The drainage trap of the present invention is particularly useful for winterizing recreational motor homes (i.e., RV's). It includes a length of flexible tubing having a first end which is removably attachable to the drain of a sink or the like and a second end which is removably attachable to a discharge pipe which is connected to either a sewer line or to a septic tank. The drainage trap of the present invention has a generally S-shaped configuration between the first and second ends of the flexible tubing formed by adjoining but oppositely directed U-shaped bends. In some embodiments, one of the U-shaped bends is distorted by straightening or spreading one of the legs.

Other objects and features of the present invention will be apparent.

BRIEF DESCRIPTION OF THE DRAWINGS

The present invention will now be described with reference to the attached description in which like numerals are used to refer to like parts where they may appear throughout the several views, and wherein:

FIG. 1 is a front perspective view of a drainage trap in accordance with the present invention showing a clamping device on each end of the drainage trap and a discharge pipe at one end of the drainage trap;

FIG. 1A is a detail showing a first means for adjusting the diameter of the drainage trap at its attachment end;

FIG. 2 is a cross sectional view taken along line 2—2 in FIG. 1;

FIG. 3 is a front perspective view of another embodiment of a drainage trap of the present invention showing a clamping device on each end of the drainage trap and a discharge pipe at one end of the drainage trap;

FIG. 3A is a detail showing a second means for adjusting the diameter of the drainage trap at its attachment end; and, FIG. 4 is a cross sectional view taken along line 4—4 in FIG. 3.

While two embodiments of the invention are illustrated in the above-mentioned drawings, it will be understood that they are merely for the purpose of illustration and that various changes in construction may be resorted to in the course of manufacture in order that the invention may be utilized to the best advantage according to circumstances which may arise, without any manner departing from the spirit and intention of the invention which is to be limited only in accordance with the appended claims. And while there is stated the primary field of utility of the invention, it remains obvious that it may be employed in any other capacity wherein it may be applicable.

DETAILED DESCRIPTION OF THE INVENTION

Referring now to the drawings, and more particularly, to FIG. 1, there is shown a self-supporting, flexible drainage trap assembly 10 which represents one embodiment of the present invention. The drainage trap assembly 10 includes a tubing portion 12, a clamping device 14 connected to a first end 15 of the tubing portion 12, a clamping device 16 connected to a second end 18 of the tubing portion 12 and a trap portion 20 formed in a bend in the tubing portion 12.

In normal use of the drainage trap assembly 10, the first end 15 of the tubing portion 12 is removably mounted to a sink outlet (not shown) or a similar apparatus and the second end 18 of the tubing portion is usually removably mounted to a discharge pipe 24. The first end 15 of the tubing portion 12 is normally considered the upper portion of the drainage trap 10 since it is the end closest to the sink outlet (not shown). The second end 18 of the tubing portion 12 is normally considered the lower end since it is the end which closest to the discharge pipe 24. Liquid and solid waste which passes through the tubing portion 12 is normally dispose of through the second end 18 by means of the connecting discharge pipe 24 which is attached to either a sewer line or a septic system.

The tubing portion 12 is preferably made out of corrosion resistive, flexible material. The material used should be self-supporting and capable of maintaining a moldable shape. A preferred material to use for the tubing portion 12 which has all the attributes needed for the tubing portion 12 of the present invention is rubber. The use of rubber for the tubing portion 12 of the drainage trap assembly 10 allows the drainage trap assembly 10 to be both self-supporting and flexible. The bent section of the tubing portion 12 where the trap portion 20 is located can be inverted by lifting the trap portion 20 upwardly with the first and second ends 15, 18 of the tubing portion 12 in their mounted position. The degree of flexibility of the drainage trap assembly 10 depends on several parameters. The two most important parameters are the type of material used for the tubing portion 12 and the wall thickness of the tubing.

In the preferred embodiment of the present invention the material selected for the tubing portion 12 of the drainage trap assembly 10 and wall thickness of the tubing portion 12 should be chosen so that the drainage trap assembly 10 is stiff enough to maintain the desired shape shown in the two embodiments of the present invention illustrated in FIGS. 1 and 3. The material and wall thickness should also be chosen so that tubing portion 12 is flexible enough to allow the trap portion 20 to be movable in the horizontal and vertical direction and allow the trap portion 20 to be manually manipulatable to facilitate drainage.

Referring to FIG. 1 showing one embodiment of the present invention, the tubing portion 12 is shown as having an S-shaped configuration formed by adjoining but oppositely directed U-shaped bends 26 and 28. Bend 26 forms trap portion 20 and one leg of bend 28 is straightened as the tubing portion 12 connects to discharge pipe 24. As shown, the wall thickness of tubing portion 12 varies along its length. The trap portion 20 of the drainage trap assembly 10 serves as an air-seal for preventing foul air from passing though the tubing portion 12 from the sewer or septic system to which the discharge pipe 24 is connected. The trap portion 20 of the present invention can be drained by lifting tubing portion 12 upwardly in the vicinity of the trap portion 20 without dismantling the first and second ends 15, 18 of the tubing portion 12 from the drainage trap assembly 10. The generally S-shaped configuration of the tubing portion 12 allows the trap portion 20 to be movable horizontally towards the second end 18 and to be movable vertically towards the first end 15 while the first and second ends 15, 18 are mounted in place in the drainage trap assembly 10 without dismantling the first and second end of the tubing portion 12.

As shown in FIG. 1A, one or both of ends 15, 18 can include an integral removable sleeve 29 which can be cut away for example to adapt the end to from 1¼ inch pipe to 1½ inch pipe. Alternatively, as shown in FIG. 3A, sleeve 29' can be a separate section clamped in the ends 15 or 18 to adapt the end from 1¼ inch to 1½ inch pipe or the like.

Referring now to FIG. 3 of the drawings wherein another embodiment of a drainage trap assembly 10' of the present invention is illustrated. The tubing portion 12' has a S-shape configuration and is shown with a first bend 26' and a second oppositely directed bend 28'. The trap portion 20' is located at the first bend 26' which is the bend closest to the first end 15' of the tubing portion 12'. The S-shaped configuration of the tubing portion 12' allows the trap portion 20' to be movable horizontally towards the second end 18' and to be movable vertically towards the first end 15' to drain the trap portion 20.

In a preferred embodiment of the present invention for the drainage trap assembly 10', the wall thickness of the tubing portion 12' at the first bend 26' should be at least fifty percent thinner than the wall thickness at the second bend 28' to obtain the desired degree of flexibility and to maintain the desired shape for the drainage trap assembly 10'.

In all embodiments the first U-shaped bend is inverted above the second U-shaped bend whereby the contents of the trap portion can be drained into the discharge pipe through the second end.

From the foregoing specification, it will be apparent that the invention disclosed will adequately accomplish the functions for which it has been designed in an economical manner and that it is an important contribution to the art to which it pertains.

It is believed that persons skilled in the art to which the invention relates will be able to obtain a clear understanding of the invention after considering the description in connection with the drawings. Therefore, a more lengthy description is regarded as unnecessary. Changes in shape, size and rearrangement of details and parts such as come within the purview of the invention claimed may be resorted to in actual practice, if desired.

What is claimed is:

1. A drainage trap comprising a self-supporting, flexible tubing having a generally S-shaped configuration with first and second oppositely directed generally U-shaped bends; said tubing having a first and upper end removably attachable to a drain outlet and a second and lower end removably attachable to a discharge pipe; said first U-shaped bend forming a trap portion and said tubing being manually manipulatable to allow the trap portion to be movable vertically towards the first end and horizontally towards the second end to a position wherein the first U-shaped bend is inverted above the second U-shaped bend whereby the contents of the trap portion can be drained into the discharge pipe through the second end.

2. The trap of claim 1 wherein the wall thickness of the tubing varies and wherein the tubing is thinner in the first U-shaped bend such that the trap portion can be inverted to drain the trap portion and thicker in the second U-shaped bend such that the tubing is self-supporting and does not collapse.

3. The trap of claim 2 wherein the wall thickness of the tubing in the fist U-shaped bend is fifty percent or less the wall thickness of the tubing in the second bend.

4. The trap of claim 3 wherein the tubing is made of rubber.

5. The trap of claim 2 wherein one or both of the first and second ends of the tubing includes an integral removable sleeve to adapt the end of the tubing for connection to pipes of different diameters.

6. The trap of claim 2 wherein one or both of the first and second ends of the tubing includes a removable sleeve to adapt the end of the tubing for connection to pipe of different diameters.

* * * * *